United States Patent
Edmunds et al.

(10) Patent No.: US 9,535,692 B2
(45) Date of Patent: Jan. 3, 2017

(54) SYSTEMS AND METHODS FOR MANAGING RELATED FILES IN A SOFTWARE DEVELOPMENT ENVIRONMENT

(75) Inventors: Randall Edmunds, San Diego, CA (US); Mitsuko Yoneyama, Redwood City, CA (US); Christopher Bank, Irvine, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2112 days.

(21) Appl. No.: 12/049,192

(22) Filed: Mar. 14, 2008

(65) Prior Publication Data
US 2013/0212557 A1    Aug. 15, 2013

(51) Int. Cl.
    G06F 9/44        (2006.01)
(52) U.S. Cl.
    CPC .................................... G06F 8/75 (2013.01)
(58) Field of Classification Search
    CPC ................................ G06F 8/34; G06F 8/75
    USPC .................................................. 717/100, 109
    See application file for complete search history.

(56) References Cited

U.S. PATENT DOCUMENTS

| | | | |
|---|---|---|---|
| 6,182,122 B1 * | 1/2001 | Berstis | ........................ 709/217 |
| 6,247,020 B1 | 6/2001 | Minard | |
| 7,316,003 B1 | 1/2008 | Dulepet et al. | |
| 7,373,594 B1 | 5/2008 | Lopez et al. | |
| 7,448,024 B2 | 11/2008 | Breeden et al. | |
| 7,480,897 B2 | 1/2009 | Reinhardt et al. | |
| 7,536,641 B2 | 5/2009 | Rosenstein et al. | |
| 7,665,061 B2 * | 2/2010 | Kothari et al. | .............. 717/106 |
| 7,730,083 B2 * | 6/2010 | Almeida | ....................... 707/770 |
| 2003/0023641 A1 | 1/2003 | Gorman et al. | |
| 2004/0268231 A1 | 12/2004 | Tunning | |
| 2005/0120292 A1 * | 6/2005 | Suzuki | ...................... 715/501.1 |
| 2005/0229154 A1 * | 10/2005 | Hiew et al. | .................. 717/110 |
| 2006/0026503 A1 | 2/2006 | Bartosh et al. | |
| 2006/0064676 A1 | 3/2006 | Chavan | |

(Continued)

OTHER PUBLICATIONS

Hossein Bidgoli, The Internet Encyclopedia, 2004, John Wiley and Sons, vol. 1, p. 824.*

(Continued)

*Primary Examiner* — Robert Beausoliel, Jr.
*Assistant Examiner* — Hau H Hoang
(74) *Attorney, Agent, or Firm* — Kilpatrick Townsend & Stockton LLP

(57) ABSTRACT

Systems and methods are provided for managing, in a software development environment, related files that are used for generating an output presentation document. A software development environment discovers the related files for an application (e.g., web page) that is being authored, and the software development tool presents a visual indication (e.g., graphical tabs) of the discovered related files in a user interface. The software development tool further aids in managing the presentation of the related files by enabling any of the related files to be selectively displayed in a designated interface (e.g., window). That is, a designated interface may be provided in which the content of any selected related file may be alternately displayed in response to a user selecting a visual indication of a related file. In one embodiment, the designated interface is a textual source code view interface that is provided by the software development tool.

16 Claims, 8 Drawing Sheets

(56) References Cited

U.S. PATENT DOCUMENTS

| | | |
|---|---|---|
| 2006/0129926 A1 | 6/2006 | Malek et al. |
| 2006/0200751 A1 | 9/2006 | Underwood et al. |
| 2006/0212843 A1* | 9/2006 | Zaky et al. ............... 717/106 |
| 2006/0248442 A1 | 11/2006 | Rosenstein et al. |
| 2006/0253508 A1* | 11/2006 | Colton et al. ............... 707/206 |
| 2008/0016488 A1 | 1/2008 | Adams et al. |
| 2008/0141118 A1 | 6/2008 | Arkhipov et al. |

OTHER PUBLICATIONS

Hossein Bidgoli, The Internet Encyclopedia Cover, 2004, John Wiley and Sons, vol. 1.*
Geoff Blake, Ten Top Dreamweaver, Feb. 13, 2006, Peachpit Tree, p. 302.*
Damon Dean and Andy Cowitt, Macromedia Studio 8 All-in-One Reference for Dummies, Jan. 11, 2006, John Wiley & Sons, p. 163-166.*
Hossein Bidgoli, The Internet Encyclopedia vol. 1, Jan. 20, 2004, John Wiley & Sons.*
Peter Christian & Heidi Farley, An Introduction to Creating Web Pages, version 4.2, Feb. 2007.*
Beginning JSP, JSF, and Tomcat Web development by Giulio Zambon with Michael Sekler, Apress, 2007, p. 2-5.*
Getting to Know FrontPage 2003, p. 28-30.*
Foundations of Microsoft Expression Web, The Basics and Beyond by Cheryl D. Wise, Apress, May 7, 2007.*
Macromedia Dreamweaver 8 Unleashed written by Zak Ruvalcaba, chapter 13 Managing Website Content Using Contribute, Sams, Oct. 7, 2005, ISBN: 0-672-32760-0.*
Adobe Dreamweaver CS3 Unleashed by Zak Ruvalcaba, Sams, pub. date: Oct. 18, 2007, ISBN: 0-672-32944-9, chapter 1, chapter18, and chapter 19.*
Non Final Office Action in related U.S. Appl. No. 12/098,304 dated Dec. 8, 2011.
www.barebones.com/products/bbedit/featuresweb.shtml, pp. 1-2, Apr. 3, 2008.
www.panic.com/coda/, pp. 1-15, Apr. 3, 2008.
www.ultraedit.com/index.php?name=UE HTMLFeatures, pp. 1-3, Apr. 3, 2008.
www.getfirebug.com/, pp. 1-5, Apr. 3, 2008.
U.S. Appl. No. 12/098,295, filed Apr. 4, 2008.
U.S. Appl. No. 12/098,304, filed Apr. 4, 2008.
"Getting to Know FrontPage," 2003, 32 pages.
Aoki, et al., "A Web Site Editing System based on Unfold/Fold Operations," 2002, 6 pages.
Murray, et al., "Creating a Web Pate and Web Site Using Microsoft FrontPage 2003 for Windows 2000lMe/XP," Oct. 2003, 59 pages.
Wendelin, et al. "10 Things you didn't know about Firebug (last accessed Dec. 19, 2011 )," 2007, 2 pages.
Non Final Office Action in related U.S. Appl. No. 12/098,295 dated Dec. 28, 2012, 29 pages.

* cited by examiner

SYSTEMS AND METHODS FOR MANAGING RELATED FILES IN A SOFTWARE DEVELOPMENT ENVIRONMENT

CROSS-REFERENCE TO RELATED APPLICATIONS

N/A.

TECHNICAL FIELD

The following description relates generally to software code authoring tools, and more specifically to software code authoring tools that provide a user interface that comprises a presentation output view (or "design view") and a textual source code view, wherein the software code authoring tool further presents a visual indication of related files for an application under development, any of which may be selected by a user for display in the textual source code view.

BACKGROUND

Many software development tools are available today for use by software designers (or "developers") in creating various types of software applications. Software "designers" and "developers" are used interchangeably herein, and generally refer to anyone involved with using a software development tool (or "authoring tool") for authoring a software application. Authoring may include coding, designing, and/or otherwise creating or modifying the software application. A software application, as used herein, generally refers to any application that may be executed by a processor (or interpreter of some type) in order to perform operations defined by the instructions of the software application, including as an example presenting a user interface to a display. One example of such a software application is a web page, which may be defined in a markup language, such as HTML, XML, etc., JavaScript, and/or other underlying page source code that may be read and interpreted by a browser to generate a corresponding output presentation of the web page to a display.

In a software development environment, a developer may interact with a software development tool for writing code, compiling the code, testing or debugging the code, and packaging the resulting application for deployment in a run-time environment. The software development tool may be implemented as a software application that is stored to a computer-readable medium and executed by a computer processor to perform the tasks associated with aiding a developer in the development of a software application. As one example, an integrated development environment (IDE) is commonly used for developing software applications. In general, an IDE is a programming environment that has been packaged as a software application program, typically including a code editor, a compiler, a debugger, and a graphical user interface (GUI) builder. The IDE may be a stand-alone application or may be included as part of one or more existing and compatible applications. IDEs provide a user-friendly framework for many modern programming languages, such as Visual Basic, Java, and PowerBuilder. IDEs for developing markup language (e.g., HTML, XML, etc.) applications are among the most commonly used.

Thus, IDEs provide software authoring tools that allow a developer (e.g., a web developer) to create web pages, websites, interactive applications, and the like for use by end users (e.g., visitors to websites). Various IDEs exist in the current marketplace, such as DREAMWEAVER®, available from Adobe Systems Incorporated, and FRONTPAGE®, available from Microsoft Corporation. DREAMWEAVER is one example of a software authoring tool that allows web developers to design Hypertext Markup Language (HTML) web pages in both a code editor and a graphical-based design time environment. DREAMWEAVER also allows the developer to design in other markup languages, such as, for example, Extensible Markup Language (XML), Extensible HTML (XHTML), Active Server Page (ASP), COLDFUSION™ Markup Language (CFML™), and the like.

Many software application authoring tools, as may be provided by an IDE, are available today for use by software developers in creating various types of software applications, including as examples such software code authoring tools as ADOBE® DREAMWEAVER® and MICROSOFT® FRONTPAGE®. Certain authoring tools, such as ADOBE® DREAMWEAVER®, allow a developer to create a document in an environment that includes both a text-based code view and a graphical-based design view. The code view renders the source code (e.g., markup language code) as text in a portion of the screen and allows the developer to see and manipulate the source code in the document file. For example, the developer may write and edit HTML or Cascading Style Sheets (CSS) code in the code view. The design view (or "display view"), on the other hand, is a What You See Is What You Get (WYSIWYG) view of the document that allows the user to visually manipulate the interpreted and graphically laid-out version of the document, such as, for example, by dragging, dropping, cutting, and pasting visual components. For instance, techniques similar to those employed by browsers may be employed for presenting the resulting output presentation (e.g., web page) of the underlying source code, wherein the developer may manipulate such output presentation within the design view. As the developer works, changes to the document are reflected in both the code view and the design view.

Once a designer creates source code (which may be referred to as a "source page"), such source code is typically stored to a web server that is accessible by clients via a communication network, such as the Internet. The clients may access the web server and download the source code, which a browser executing on the client's computer interprets to generate a corresponding output presentation, as is well known in the art.

Many software applications comprise a main file with one or more related files. In general, a "related file" refers to a file required to build another document. In some software development tools, such as DREAMWEAVER, these related files may be referred to as "dependent" files. For instance, a main file may be created that references one or more related files that must also be accessed/interpreted in order to generate a presentation output document. As an example, a main web page document (e.g., main HTML document) may be created that references other related files that are used to generate at least a portion of the presentation output that is to be presented by a client's browser for the web page. For instance, a main web page document may reference such related files as images, external style sheets, scripting language files (e.g., JavaScript files, etc.), and/or other files that a browser loads when it loads the web page. The browser may use the various related files to construct the output presentation document that is presented to the client.

As one example, style sheets, such as cascading style sheet ("CSS"), are commonly employed to help readers of web pages (e.g., browsers) to define visual layout of a web page's content, such as colors, fonts, layout, and other aspects of document presentation. In this manner, the style sheet may be designed primarily to enable the separation of document content (written in HTML or a similar markup language, e.g., in a main file) from document presentation (written in CSS). Thus, the main HTML file for a web page may be authored to define certain content and/or reference one or more other related files that provide certain content (e.g., image files) that is desired to be presented in an output presentation document that is to be generated when the web page is interpreted by an interpreter program (such as a client browser), and the main HTML file may reference one or more style sheets that define the visual layout of such content that is desired to be generated within the output presentation document. Such use of style sheets are well known in the art.

As another example, scripting language files, such as JavaScript (JS) files, are commonly employed to provide functions that may be executed during run-time of a web page by a browser to further define the visual presentation and/or actions of the output presentation document presented by the browser. Thus, a main web page document (e.g., main HTML document) may reference one or more scripting language files that are invoked for imparting certain functionality for the output presentation document presented by the browser. Such use of scripting language files are also well known in the art.

Web authors generally create and edit web pages that comprise a main file (e.g., a main HTML file) with many related files, such as external JS, CSS, XML, and/or other server-side files, such as other HTML files, ColdFusion Markup Language (CFML) files, PHP files, or active server pages (ASP) files. This is the common way to construct web pages to allow sharing and re-use of components, and the authored web pages can thus become fairly complex.

Thus, when authoring a web page (or website comprising a collection of web pages), a developer often desires to author/edit not only a main file, but also the various related files. Most software development tools, such as DREAMWEAVER, provide a function within a contextual menu to enable a user to open a related file. Software development tools may provide other techniques for opening related files. For instance, in certain tools a user may right-click a pointer (e.g., mouse) on a textual reference to a related file within a main file, and in response the user may be presented an option to open the related file. As another example, certain development tools, such as MAC Xcode software, provides a drop-down list of "#include" files, which is part of the C/C++ programming language preprocessor, wherein the user can select any of the "#include" files to open.

As still another example, DREAMWEAVER provides a visual map of linked icons, called a site map. A developer may use the site map to add new files to a DREAMWEAVER site, or to add, modify, or remove links. The site map shows the site structure two levels deep, starting from the home page. It shows pages as icons and displays links in the order in which they are encountered in the source code. Before a developer can display the site map, he must define a home page for the site. The site's home page is the starting point of the map and can be any page in the site. A developer can change the home page, the number of columns displayed, whether the icon labels display the filename or the page title, and whether to show hidden and dependent files, such as image or other non-HTML content that the browser loads and when it loads the main page. When working in the site map, the developer can select pages, open a page for editing, add new pages to the site, create links between files, and change page titles. Thus, the site map feature aids in laying out an overall website structure.

In any of the above-mentioned techniques for discovering and opening related files, each related file that is opened is opened in a separate window within the software development tool. The user is then tasked with managing the multiple windows. For instance, the user is often required to move, resize, tile, and/or perform other tasks for managing the view of the multiple windows for the related files. Such management of windows can become cumbersome and/or inefficient for the developer, and it may lead to difficulty in finding a window for a desired related file and/or understanding which related file the developer is viewing in a given window.

In view of the above, users of traditional software development environments have been required to search through menus and/or source code of a main file to discover related files, and the users are then tasked with opening any of the related files that the user desires to view and/or edit. Any such related files are opened in separate windows, and thus the user is then required to manage the separate windows in which the various related files are contained.

In view of the above, a desire exists for an improved related file management solution that enables a user-friendly way for developers to manage the view within a software development environment of the various related files of a given application (e.g., web page) that is being authored.

SUMMARY

The present invention is directed Generally to systems and methods for managing related files in a software development environment. As described further hereafter, embodiments of the present invention provide a software development environment that aids a user in discovering and managing presentation of such related files. For instance, in certain embodiments, the software development tool discovers the related files for an application (e.g., web page) that is being authored, and the software development tool presents a visual indication (e.g., tabs, list, etc.) of the discovered related files in a user interface. In this way, the user can easily see the related files that exist for the application (e.g., web page) being authored, and the user can readily access any of the related files by interacting with the corresponding visual indication (e.g., clicking a pointing device, such as a mouse, on the visual indication).

According to certain embodiments, the software development tool further aids in managing the presentation of the related files by enabling any of the related files to be selectively displayed in a designated interface (e.g., window). That is, a designated window may be provided in which the content of any selected related file may be displayed. For instance, in response to a user selecting a visual indication of a related file (e.g., by clicking a graphical tab that identifies the related file), the software development tool presents the content of the corresponding related file in the designated interface. In response to the user then selecting a visual indication of a different related file (e.g., by clicking a graphical tab that identifies the different related file), the software development tool presents the content of the corresponding different related file in the designated interface. In this way, the content of any one of the related files may be alternately presented in the designated interface, thereby alleviating the user from having to manage a variety of different windows. As discussed hereafter, in one embodiment, the designated interface is a textual source code view interface that is provided by the software development tool.

In one embodiment, the software development tool provides a user interface that comprises a output presentation view (or "design view") and a textual source code view. The software development tool presents a visual indication of related files for an application under development (e.g., web page). Such a visual indication may be tabs (or other visual indicator) displayed in association with the textual source code view, such as tabs across the top of the code view interface. And, the user may select any of the related files or the main file for display in the textual source code view.

In certain embodiments, a split view may be presented by the software development tool in which the design view and the textual source code view are each simultaneously presented on designated portions of the software development tool's user interface. The design view may remain present on the interface and provide a consistent view of the visual output presentation of the output presentation document under development (e.g., a representation of an output presentation document that is to be generated by a browser in response to a web page's main file and related files). And, the code view can selectively present the content of any one of the main file and related files.

In view of the above, embodiments of the present invention provide an improved related file management solution that enables a user-friendly way for developers to manage the view within a software development environment of the various related files of a given application (e.g., web page) that is being authored. For instance, embodiments of the present invention automatically discover related files for a main file that is being authored, thereby alleviating users from searching through menus and/or source code of the main file in order to discover related files. Further, embodiments of the present invention provide a visual indicator that identifies the discovered related files, and enables the content of any of the related files to be selectively presented in a common, designated interface, thus alleviating the user from managing separate windows for the various related files.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1A:
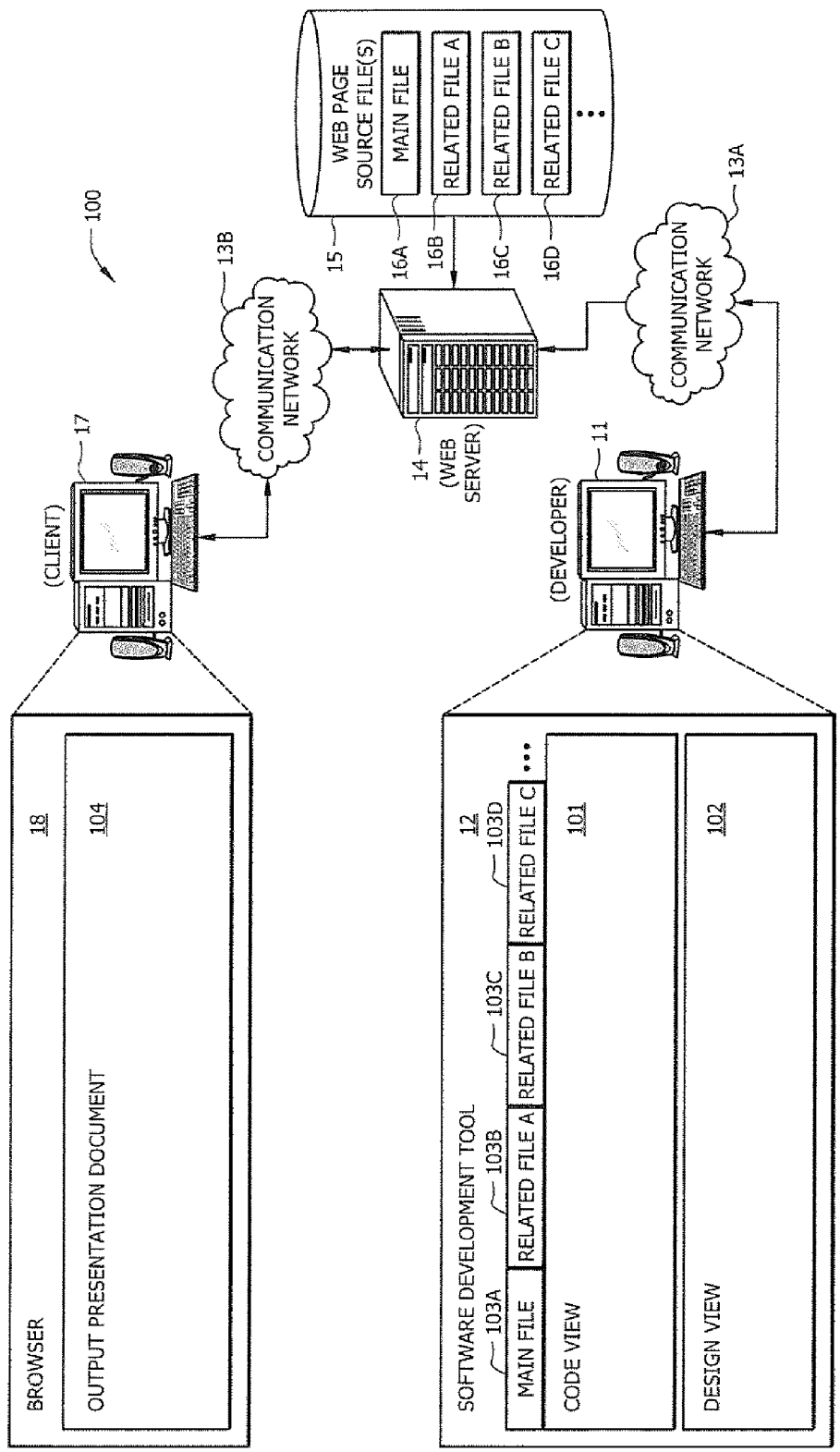
FIGS. 1A-1C show an exemplary system illustrating a web page authoring environment according to one embodiment.
Figure 1B:
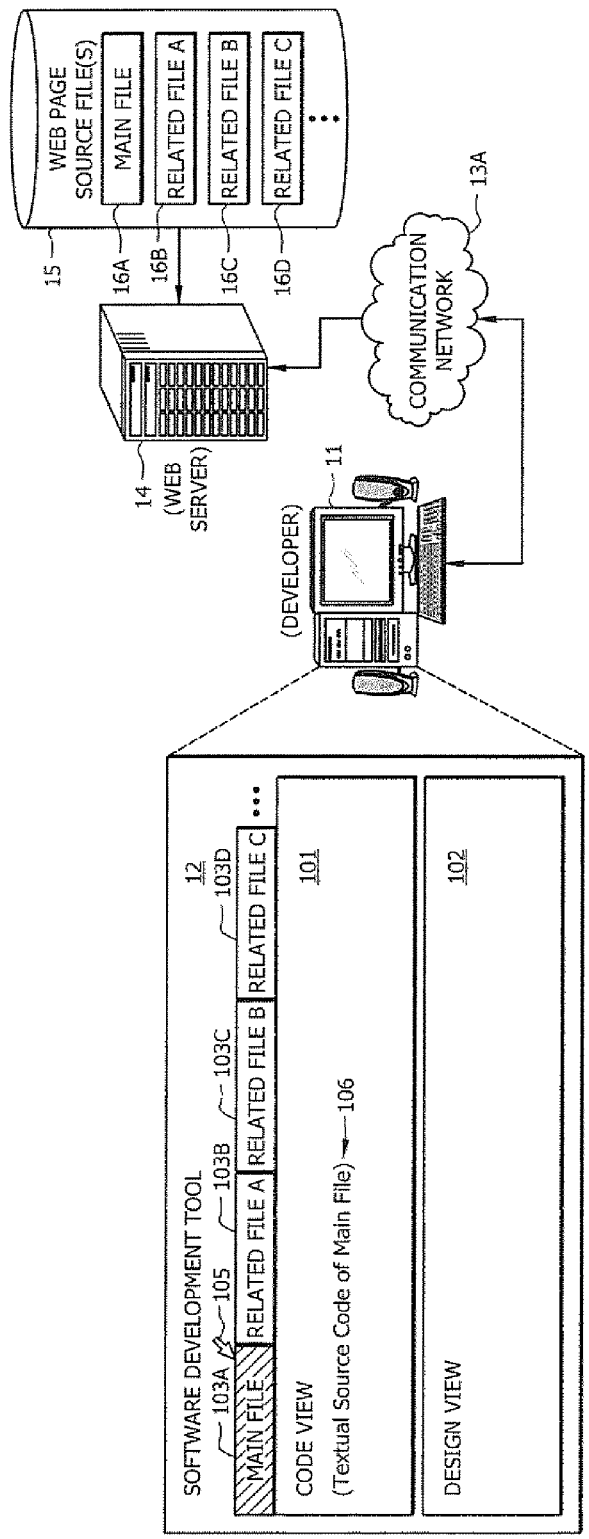
Figure 1C:
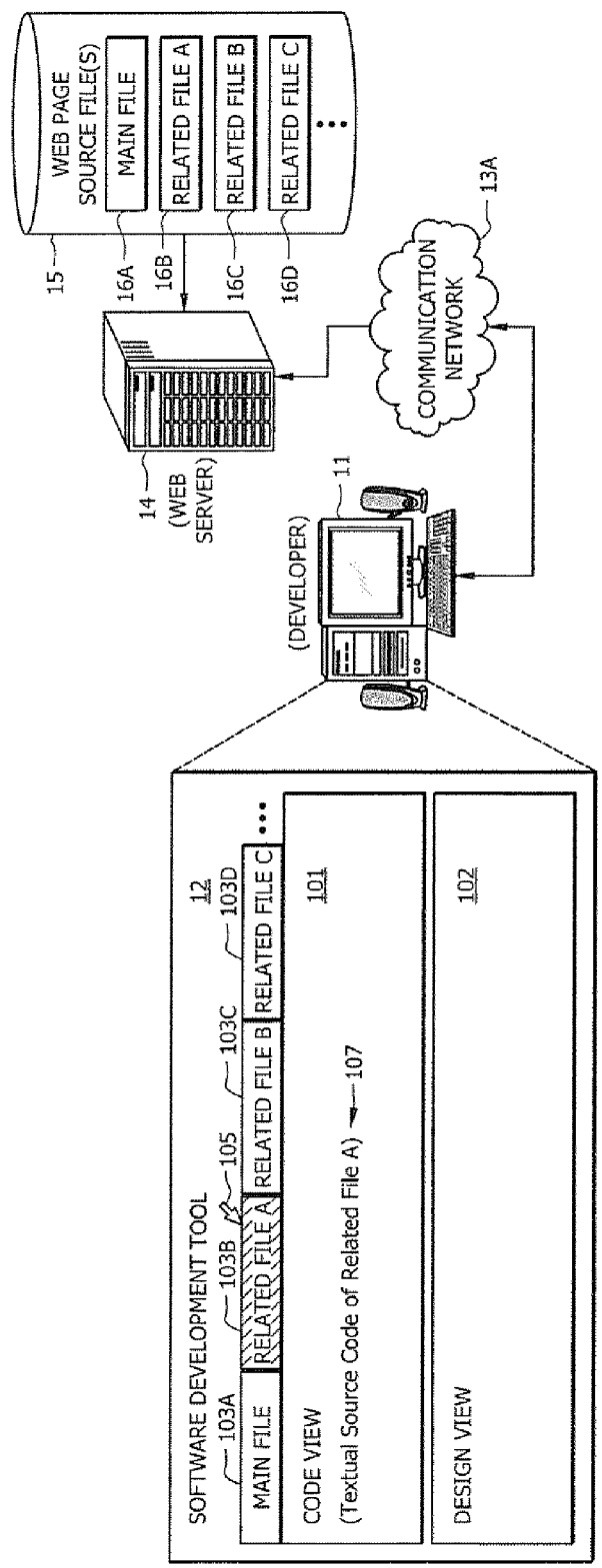

Turing to FIGS. 1A-1C, a block diagram of a system 100 illustrating an exemplary web page authoring environment of an embodiment of the present invention is shown. As shown, system 100 comprises a first processor-based computer 11, such as a personal computer (PC), laptop computer, server computer, workstation computer, etc. In this example, a software development tool (e.g., web authoring application) 12 is executing on computer 11. Development tool 12 comprises computer-executable software code stored to a computer-readable medium that is readable by a processor of computer 11 and, when executed by such processor, causes computer 11 to perform the various operations described further herein for such development tool 12. Examples of such a software development tool 12 include DREAMWEAVER®, available from Adobe Systems Incorporated, and FRONTPAGE®, available from Microsoft Corporation.

Development tool 12 may enable authoring of software code for web pages (e.g., as is commonly coded using such development tools as those included in DREAMWEAVER® and FRONTPAGE® mentioned above). In many cases, such development tool 12 enables an author (e.g., website designer) to create textual source code that defines a graphical presentation format to be generated by an outputting application (e.g., a web page output by a browser, etc.). Thus, a designer may interact with development tool 12 (via computer 11) to develop a web page for a customer, as discussed further below.

As discussed above, web pages are commonly authored that comprise a main file (e.g., a main HTML file) with many related files, such as external JS, CSS, XML, and/or other server-side files, such as other HTML files, ColdFusion Markup Language (CFML) files, PHP files, or active server pages (ASP) files. Such files may be referred to herein as "source files", as they are used together by an interpreting application, such as a browser, to build/generate an output presentation document. In the illustrated example of FIG. 1A, a main file 16A and various related files 16B-16D are authored, which together provide source files that are used for generating an output presentation document 104 by a browser 18. Thus, the related files 16B-16D may comprise any related files, such as external JS, CSS, XML, and/or other server-side files, such as other HTML files, CFML files, PHP files, or ASP files. Further, while 3 related files are shown for illustrative purposes in the example of FIGS. 1A-1C, those of ordinary skill in the art will readily appreciate that any number of such related files may be present in a given web page implementation. Furthermore as used herein, the "related files" may refer to any files that are used together with the main file for building/generating an output presentation document 104.

In the example of FIGS. 1A-1C, development tool 12 is operable to present one or more user interfaces with which a user (e.g., designer) may interact to author a document, such as the source files 16A-16D, that defines an output presentation document (e.g., web page), such as output presentation document 104, to be generated when read/interpreted by a browser, such as browser 18. In this example, development tool 12 presents a code view interface 101 and a design view (or "display view") interface 102. Development tool 12 may employ technology similar to that employed by browsers to read a code document (e.g., of code view 101) and display in design view 102 the corresponding page that is generated from such code. Accordingly, such design view 102 may provide developers the ability to view and edit a web page in a visual mode in which the underlying source code (e.g., HTML code, XML code, CSS code, etc.) has been rendered, as if on a web browser. While the developer works on the rendered objects, the development tool 12 may translate and effect those changes in the underlying textual code document. Thus, design view 102 provides a design-time view of the output presentation of a web page being authored, which mimics a run-time view of the output presentation that would be presented for such web page by a browser. Such a design view 102 is a known interface that is available in certain development tools, such as in DREAMWEAVER®, available from Adobe Systems incorporated.

In contrast, code view 101 provides a simple text editor in which the actual textual source code (e.g., HTML code, XML code, CSS code, etc.) defining a page to be generated is displayed to the user. Thus, code view 101 shows the textual code that defines the page to be generated when such code is read/interpreted (e.g., by a browser), while design view 102 shows the resulting generated page that is rendered when the underlying code is read/interpreted (e.g., by a browser).

Once a designer creates source file(s) 16A-16D for a page via development tool 12, such source file(s) is/are typically stored to hosting web server(s) 14. For instance, the source file(s) for a web page may be pushed from computer 11 to web server 14 via a communication network 13A, such as a local area network (LAN), the Internet or other wide area network (WAN), etc. Alternatively, the source file(s) may otherwise be loaded onto web server 14, and/or computer 11 and web server 14 may be one in the same. The source files 16A-16D for the web page are stored to data storage 15 of web server 14. Data storage 15 may comprise a hard disk and/or other computer-readable data storage medium that is operable for storing data. Further, it should be understood that web server 14 may comprise a plurality of clustered or distributed computing devices (e.g., servers) across which the source files may be stored, as is well known in the art.

Web server 14 is accessible by clients, such as client computer 17, via a communication network 13B, such as the Internet. For instance, a client, such as client computer 17, may access web server 14 and download the source files 16A-16D, which a browser 18 executing on the client computer 17 interprets to generate a corresponding output presentation document 104. Thus, a run-time output presentation document 104 that is generated as a result of interpreting the web page source files 16A-16D that are hosted on web server 14 can be generated and presented by browser 18 executing on the client computer 17. Accordingly, a designer may create a web page's source files 16A-16D via development tool 12 for a customer, which when deployed on web sever 14 enables clients 17 to access the web page, thus enabling such clients 17 to view a run-time output presentation 104 of the page to obtain information, products, services, etc. from the customer.

According to embodiments of the present invention, software development tool 12 further aids a user in managing presentation of the source files 16A-16D (i.e., main file 16A and the related files 16B-16D). As described further hereafter, software development tool 12 aids a user in discovering and managing presentation of such source files 16A-16D. For instance, in certain embodiments, software development tool 12 discovers the related files 16B-16D for the main file 16A of an application (e.g., web page) that is being authored. And, as shown in FIGS. 1A-1C, software development tool 12 presents a visual indication (e.g., tabs, list, etc.) 103A-103D of the discovered source files in a user interface. In this way, the user can easily see the related files that exist for the application (e.g., web page) being authored, and the user can readily access any of the related files by interacting with the corresponding visual indication (e.g., clicking a pointing device, such as a mouse, on the visual indication).

In the exemplary embodiment of FIGS. 1A-1C, software development tool 12 presents a visual indication of the source files 16A-16D as tabs (or other visual indicator) 103A-103D, which are displayed in association with the textual source code view 101. And, the user may select any of the source files 16A-16D for display in the textual source code view 101 by selecting the corresponding visual indicator 103A-103D.

Thus, a split view may be presented by software development tool 12 in which the design view 102 and the textual source code view 101 are each simultaneously presented on designated portions of the software development tool's user interface. The design view 102 may remain present on the interface and provide a consistent view of the visual output presentation of the output presentation document 104 that is under development. And, the code view 101 can selectively present the content of any one of the main file 16A and related files 16B-16D in response to a user's selection of the corresponding visual indicator 101A-103D.

For instance, in the example of FIG. 1B, a user selects visual indicator 103A corresponding to main file 16A (e.g., by positioning cursor 105 over the visual indicator 103A and clicking or double-clicking a pointing device, such as a mouse). In response, the textual source code 106 of the main file 16A is presented in code view 101. Thereafter, in the example of FIG. 1C, the user selects visual indicator 103B corresponding to related file A 16B (e.g., by positioning cursor 105 over the visual indicator 103B and clicking or double-clicking a pointing device, such as a mouse). In response, the textual source code 107 of the related file A 16B is presented in code view 101. Thus, the content presented in code view 101 can be selectively alternated between any of the source files 16A-16D in response to a user selecting the corresponding one of the visual indicators 103A-103D. In this example, the one of the visual indicators 103A-103D that has been selected (and thus the corresponding source file's content is being presented in the code view 101) is shaded (or otherwise visually-indicated as selected) to aid the user in understanding which of the source file's is currently presented in the code view 101.

Any of the source files 16A-16D can be edited (e.g., in the code view 101) within software code development tool 12, and then saved to data storage 15 of web server 14. Thus, software code development tool 12 provides a server-side authoring tool that enables server-side files to be authored (e.g., created, edited, etc.) and stored at web server 14 for access by clients 17.

Certain client-side testing environment tools are known in the art, such as FireBug™. Some of these tools may allow for source code to be viewed at a client site, such as run-time source code being used by a browser for generating a given output presentation document. Further, some of these client-side testing environment tools may enable a user to modify the source code for testing of the resulting browser presentation of an output presentation document. However, any such edits are only effected for the local, client-side document, and do not result in any changes to the server-side source files 16A-16D that are being served by the web server 14. Thus, software code development tool 12 is not merely a client-side testing environment, such as that provided by FireBug, but is instead a server-side authoring tool that enables the server-side source files 16A-16D hosted by web server 14 to be authored (e.g., created, edited, etc.).

Figure 2A:
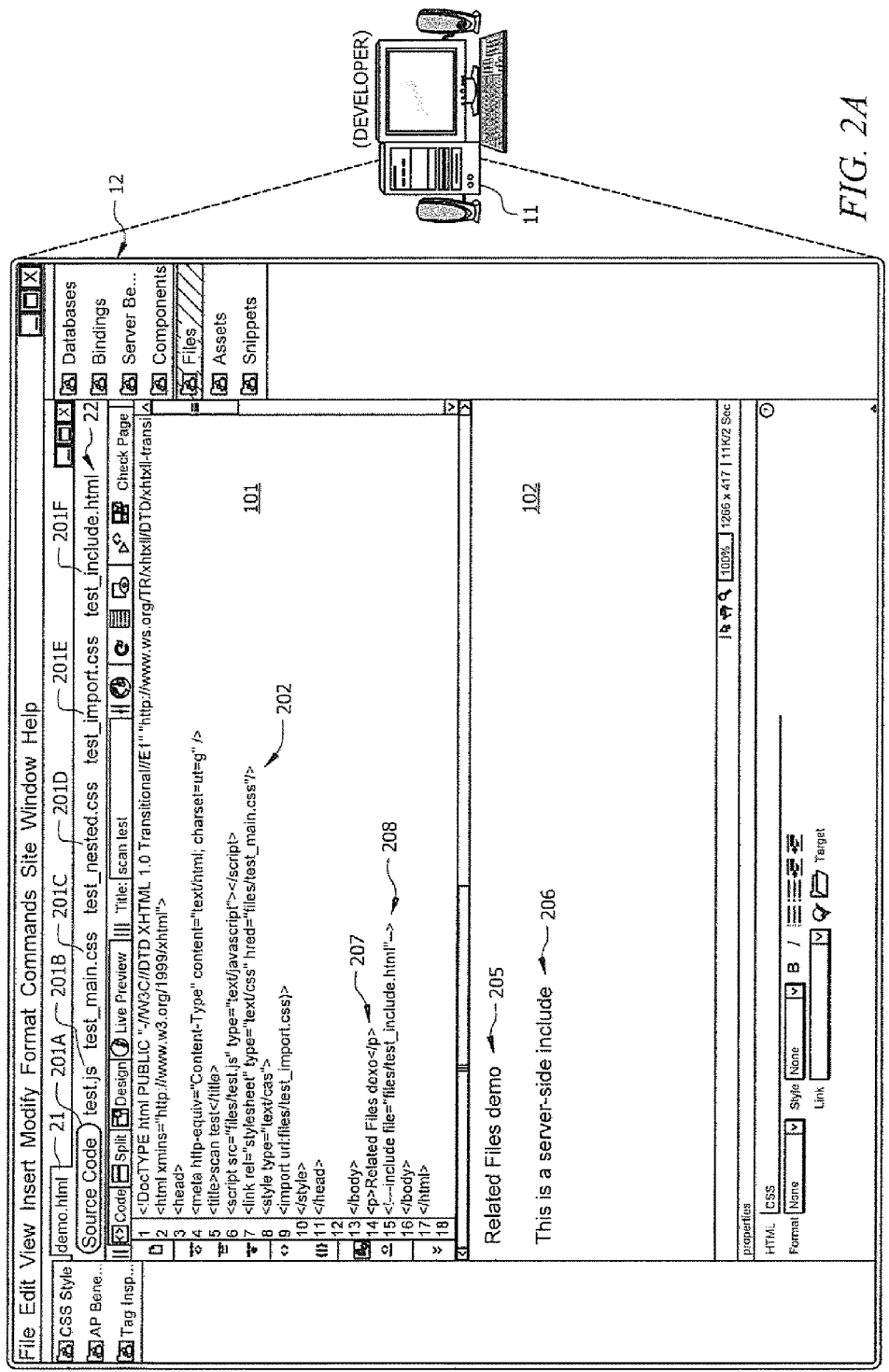
FIGS. 2A-2C show an exemplary user interface provided by a software development tool according to one embodiment.
Figure 2B:
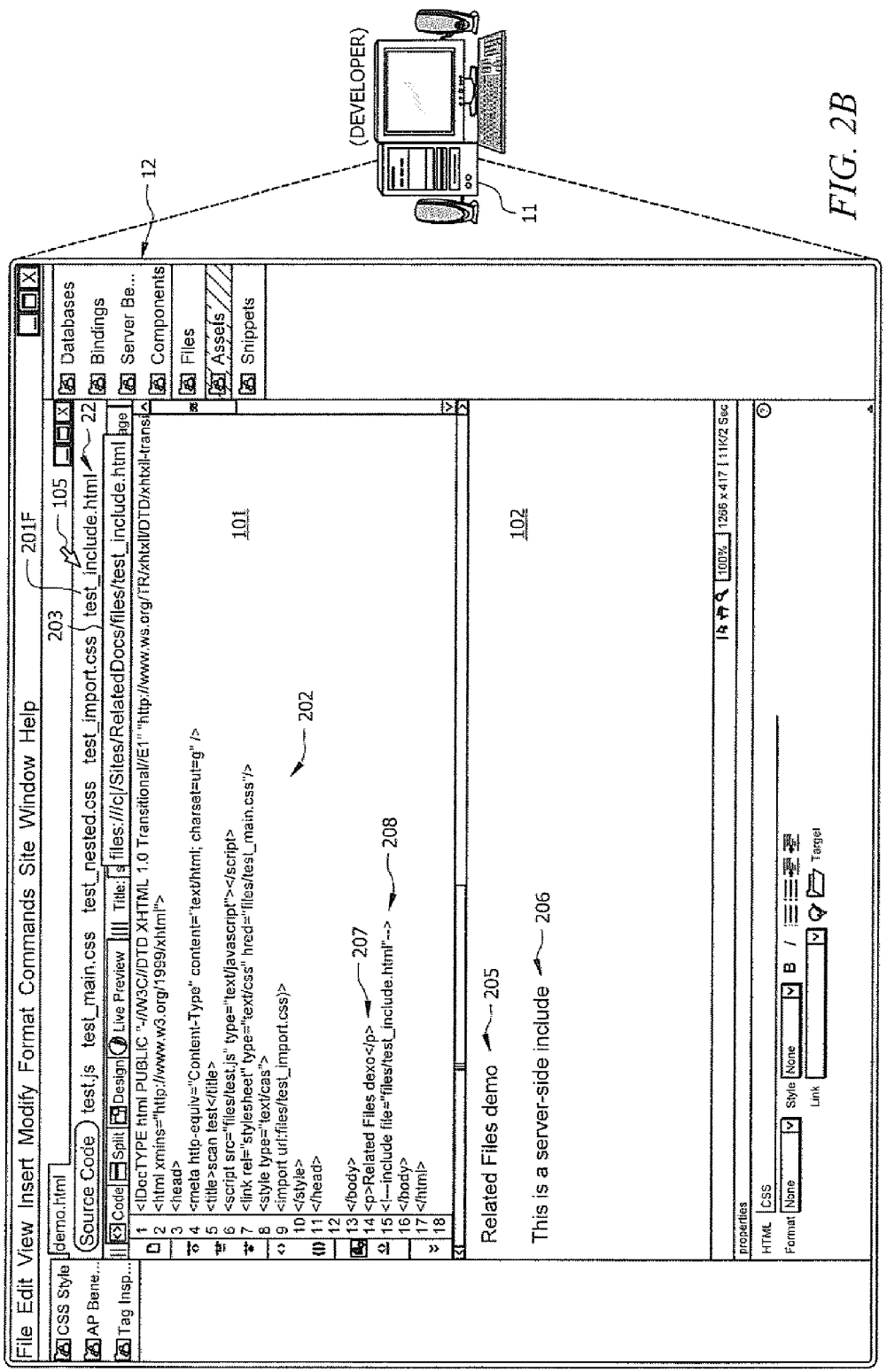
Figure 2C:
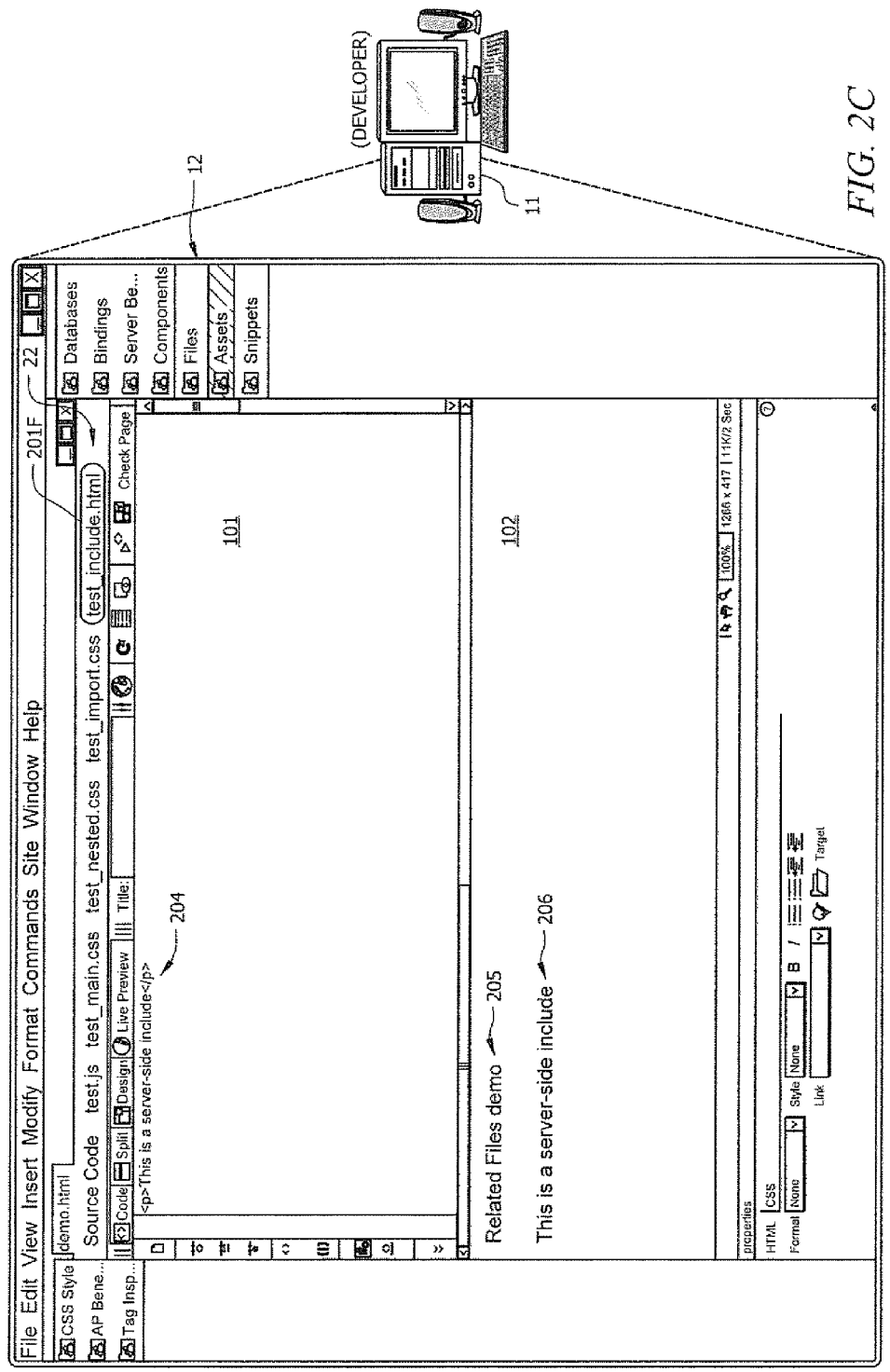

FIGS. 2A-2C show an exemplary user interface provided by software development tool 12 according to one embodiment. As in the above example of FIGS. 1A-1C, a first processor-based computer 11, such as a personal computer (PC), laptop computer, server computer, workstation computer, etc., is provided on which a software development tool (e.g., web authoring application) 12 is executing.

As shown in FIG. 2A, software development tool 12 provides a user interface that may present a code view 101 and a design view 102. A tool bar 22 is associated with the code view 101, which provides visual indicators (e.g., tabs) that identify source files for a given application (e.g., web page or web site) that is under development. In this example, a main file "demo.html" is opened by a user, and such main file is identified in a visual indicator 21. The software development tool 12 searches through the main file and determines other related files that are used along with the main file (e.g., by a browser) for building an output presentation document. Visual indicators (e.g., tabs) identifying such related files are then presented on tool bar 22.

In the illustrated example, tool bar 22 has a "source code" tab 201A presented, which when selected by a user causes the textual source code of the main file "demo.html" to be presented in the code view 101. For instance, in the example of FIG. 2A, the source code tab 201A is selected, and thus the textual source code 202 of the main file "demo.html" is presented in the code view 101.

Additionally, tool bar 22 has tabs 201B-201F presented, each of which identifies a related file, such as a CSS file, a JS file, etc. For instance, tabs 201B-201F identify related files "test.js", "test_main.css", "test_nested.css", "test_import.css", and "test_include.html", respectively. When any one of the tabs 201B-201F is selected by the user, the textual source code of the corresponding related file is alternately presented in the code view 101.

The output presentation document generated in this example is relatively simple for illustrative purposes. For instance, as shown in the design view 102, the output presentation document presents a first line of text 205 reading "Related Files demo" and a second line of text 206 reading "This is a server-side include". The first line of text 205 is contributed by textual source code instruction 207 that is present in the main file's source code 202, as shown in code view 101. The main file's source code 202 then references, in source code instruction 208 shovel in code view 101, the related file "files/test_include.html", which is the related file identified by tab 201F on tool bar 22.

As shown in FIG. 2B, in this exemplary user interface, when a user moves cursor 105 over the test_include.html tab 201F, a mouse-over event is triggered which causes pop-up text box 203 to be presented that presents the full name of the related file "test_include.html". For instance, in this example, the full path name for the related file, as shown in the text box 203, is "file:///C|/Sites/RelatedDocs/files/test_include.html". Such a mouse-over event may aid a user in identifying a correct related file that is desired to be selected, particularly in the event that two or more of the related files have the same ending names but with different paths.

FIG. 2C shows an example of the user selecting (e.g., clicking the mouse on) the test_include.html related file tab 201F. In response to such selection, the code view 101 changes to present the textual source code 204 of the related file test_include.html, rather than the source code 202 of the main file. Again, the user may selectively alternately present any one of the main file's source code or related file source code in the code view 101 by selecting the corresponding one of the tabs 201A-201F on tool bar 22.

Thus, as seen in FIGS. 2A-2C, the graphical tabs 201A-201F are immediately accessible by a user from the user interface of the software development tool 12. For instance, the user is not required to search through menu options, but instead the graphical tabs are immediately accessible on toolbar 22 of the code view 101.

As is further seen in FIG. 2C, the presentation of the output presentation document in design view 102 remains persistently displayed, as the source code for different related files is alternately presented in code view 101. In this example, the second line of text 206 shown in the output presentation document presented in design view 102 is contributed by textual source code instruction 204 that is present in the related file test_include.html's source code, as shown in code view 101 in FIG. 2C.

The user may edit the source code in the code view 101 for any selected source file, and any corresponding impact on the output presentation document may be reflected in the mimicked output shown in design view 102. For instance, the user may edit the instruction 204 of related file test_include.html to read "This text is contributed by a server-side include file" rather than reading "This is a server-side include", wherein the output text presented in the second line 206 of design view 102 will be changed correspondingly to reflect the new text. Alternatively, in certain embodiments, the user may make certain edits directly in the design view 102. For instance, the user may edit the text on the second line 206 directly in the design view 102 to read "This text is contributed by a server-side include file" rather than reading "This is a server-side include", wherein the source code 204 of the test_include.html related file will be changed correspondingly to reflect the change.

Once the source files are edited, the user may save them to the web server, such as to data storage 15 of web server 14 shown in FIGS. 1A-1C. Thus, as discussed above, software development tool 12 provides a development environment that may be employed for authoring (e.g., creating, editing, etc.) server-side source files for an application, such as a web page or website.

With the above-described related files access feature, a user of software development tool 12 can instantly see and access all the related files in the toolbar 22. Thus, according to this exemplary embodiment, the user is provided with an organized list of and quick access to all source files that are used to build an output presentation document (e.g., web page output by a browser). Thus, the user is not required to visually scan source code or use "Find" or some other tool to determine and access the related files of a document. Additionally, the presentation of multiple files is automatically managed for the user. The user is not required to constantly move, resize, tile, etc. different windows of different files with which the user is working.

According to one embodiment, the software development tool 12 parses the main file (e.g., demo.html in the example of FIGS. 2A-2C) for references to related files. This information is maintained in an internal list within the software development tool 12. The software development tool 12 then presents a toolbar 22 which displays the list of the discovered related files. Clicking on the tab of a related file in the toolbar 22 selects that corresponding file, and thus presents its source code in the code view 101. The software development tool 12 may also present this same list with the same functionality in the main menu, whereby a user can also access files through the menu interface.

Thus, the software development tool 12 may present the user with a linear list of related files which may be referenced deep in a complex main document and may reside deep in a complex web site file hierarchy. Any one of the related files and the main file may be alternately displayed in a single window, such as within the code view interface 101.

In certain embodiments, the related files discovered by the software development tool 12 and listed on toolbar 22 may include image files, video files, and/or other non-textual source files that may be used for generating an output presentation document. In these embodiments, selecting the corresponding tab may load the non-textual content into an appropriate editor for editing, such as an image editor (e.g., ADOBE PHOTOSHOP, etc.) for editing image files, a video editor for editing video files, etc. In other embodiments, the software development tool 12 filters out the non-textual source files from the listing on toolbar 22, thereby only presenting on toolbar 22 related files that contain textual source code that may be edited in code view 101.

Figure 3:
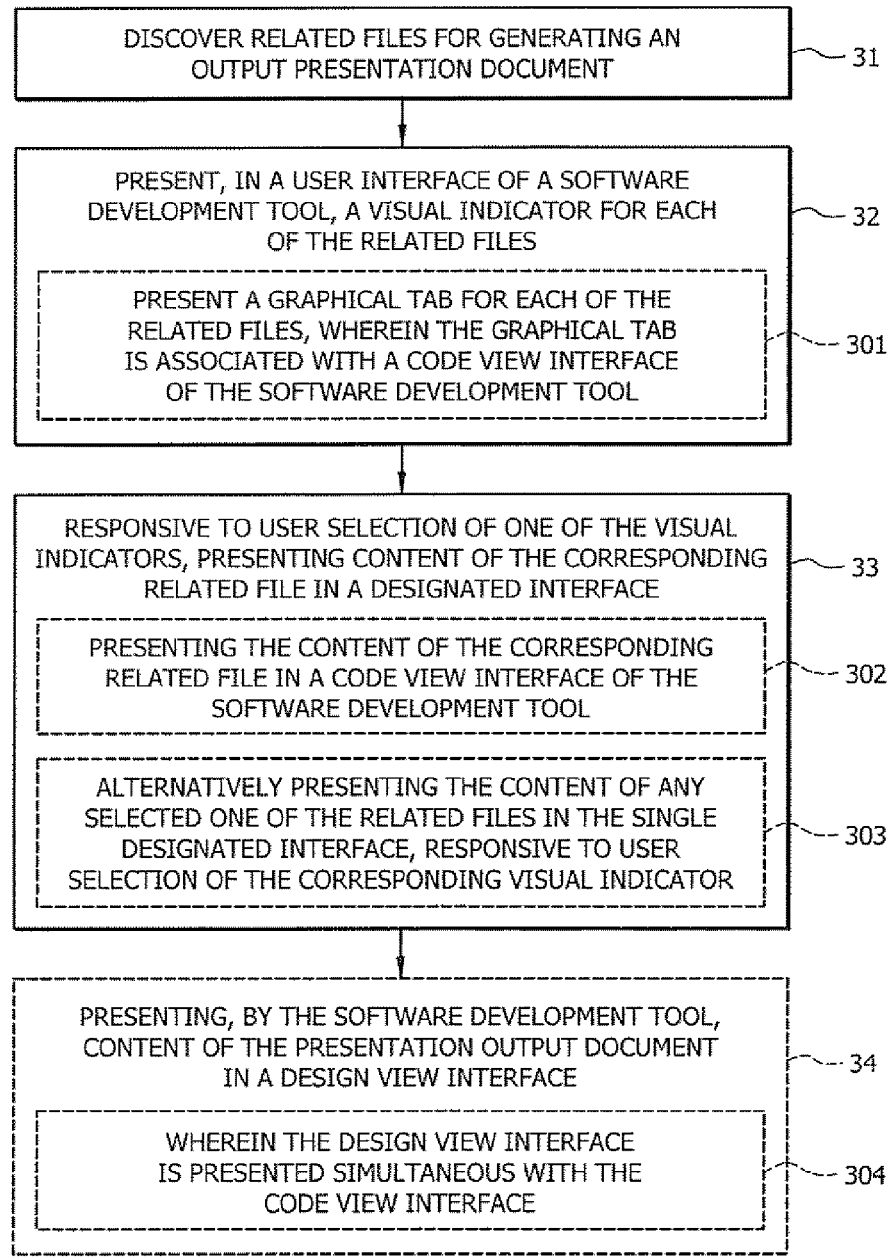
FIG. 3 shows an exemplary operational flow diagram for a software development tool according to one embodiment.

Turning now to FIG. 3, an operational flow diagram of the software development tool 12 according to one embodiment of the present invention is shown. In operational block 31, the software development tool 12 discovers related files for generating an output presentation document. Such discovery may be performed responsive to a user opening a main file for editing within the software development tool 12. The discovery may be made by parsing the main file to discover referenced related files, for instance. Browsers commonly parse main files to discover related files that are to be used for generating an output presentation document, and similar techniques as those employed by browsers may be employed by software development tool 12 for discovering the related files.

In operational block 32, the software development tool presents, in a user interface, a visual indicator (e.g., tabs, etc.) for each of the discovered related files. In certain embodiments, as shown in optional sub-block 301, the tool presents a graphical tab (such as tabs 201A-201F of FIGS. 2A-2C) for each of the related files, wherein the graphical tab is associated with a code view interface 101 of the software development tool. For instance, in the example of FIGS. 2A-2C, such graphical tabs are presented identifying related files on a toolbar 22 that visually-associated with (e.g., immediately above) the code view window 101.

In operational block 33, responsive to a user selecting one of the visual indicators (e.g., tabs), the software development tool presents the content of the corresponding related file in a designated interface. For instance, as shown in optional sub-block 302, the content may be presented in a code view interface 101 of the software development tool. As discussed above, as the user selects different visual indicators, the content presented in the designated interface (e.g., code view 101) alternates to that of the corresponding source file identified by the selected visual indicator, as indicated in optional sub-block 303.

In optional operational block 34, the software development tool 12 may present content of the output presentation document in a design view interface 102. For instance, as shown in FIGS. 2A-2C, the software development tool 12 may be configured to have a split view interface, wherein both a code view interface 101 and a design view interface 102 are shown. As indicated in the optional sub-block 304, the design view interface 102 may thus be presented simultaneously with the code view interface 101.

In view of the above, embodiments of the present invention provide an improved related file management solution that enables a user-friendly way for developers to manage the view within a software development environment of the various related files of a given application (e.g., web page) that is being authored. For instance, embodiments of the present invention automatically discover related files for a main file that is being authored, thereby alleviating users from searching through menus and/or source code of the main file in order to discover related files. Further, embodiments of the present invention provide a visual indicator that identifies the discovered related files, and enables the content of any of the related files to be selectively presented in a common, designated interface, thus alleviating the user from managing separate windows for the various related files.

Embodiments of the present invention, or portions thereof, may be embodied in program or code segments operable upon a processor-based system (e.g., computer system) for performing functions and operations as described herein. The program or code segments making up the various embodiments of the present invention may be stored in a computer-readable medium, which may comprise any suitable medium for temporarily or permanently storing such code. Examples of the computer-readable medium include such physical computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Embodiments of the present invention, or portions thereof, may be embodied in a computer data signal, which may be in any suitable form for communication over a transmission medium such that it is readable for execution by a functional device (e.g., processor) for performing the operations described herein. The computer data signal may include any signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, a local area network (LAN), a metropolitan area network (MAN), a wide area network (WAN), the public switched telephone network (PSTN), a satellite communication system, a cable transmission system, and/or the like.

Figure 4:
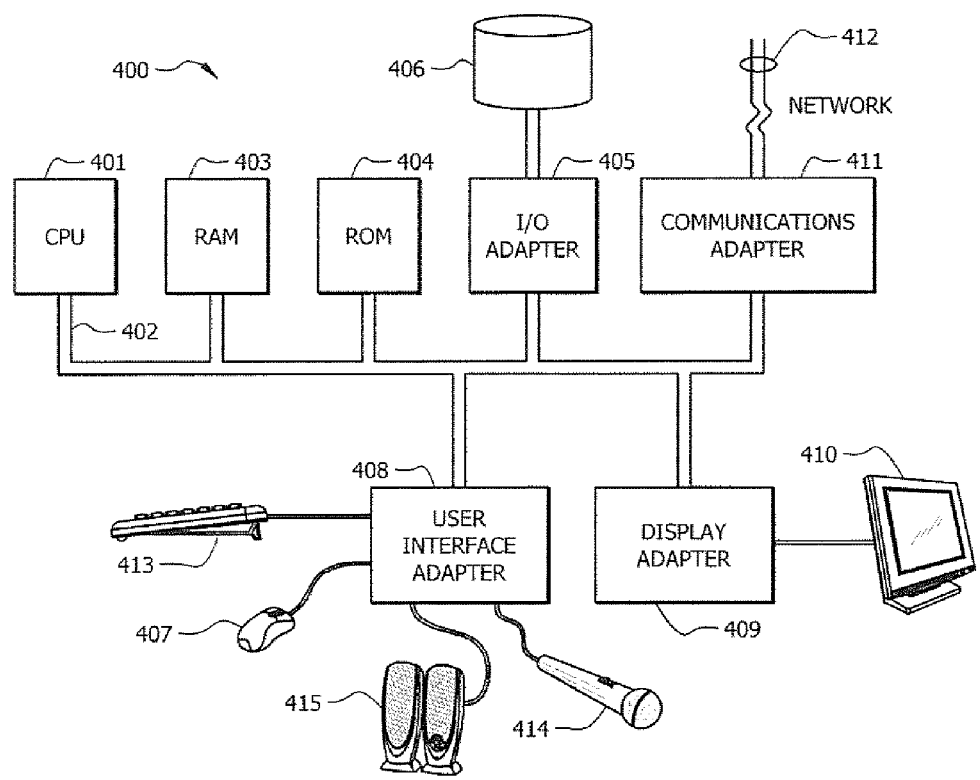
FIG. 4 shows an exemplary system on which embodiments of the present invention may be implemented.

FIG. 4 illustrates an exemplary computer system 400 on which software development tool 12, browser 18, and/or logic of server 14 may be implemented according to one embodiment of the present invention. Thus, computer system 400 may be deployed to implement a designer computer 11 on which development tool 12 resides/executes, a client computer 17 on which browser 18 resides/executes, or even a web server 14 which hosts a page's source files 16A-16D. Central processing unit (CPU) 401 is coupled to system bus 402. CPU 401 may be any general-purpose CPU. The present invention is not restricted by the architecture of CPU 401 (or other components of exemplary system 400) as long as CPU 401 (and other components of system 400) supports the inventive operations as described herein. CPU 401 may execute the various logical instructions according to embodiments of the present invention. For example, CPU 401 may execute machine-level instructions according to the exemplary operational flow described above in conjunction with FIG. 3.

Computer system 400 also preferably includes random access memory (RAM) 403, which may be SRAM, DRAM, SDRAM, or the like. Computer system 400 preferably includes read-only memory (ROM) 404 which may be PROM, EPROM, EEPROM, or the like. RAM 403 and ROM 404 hold user and system data and programs, as is well known in the art.

Computer system 400 also preferably includes input/output (I/O) adapter 405, communications adapter 411, user interface adapter 408, and display adapter 409. I/O adapter 405, user interface adapter 408, and/or communications adapter 411 may, in certain embodiments, enable a user to interact with computer system 400 in order to input information, such as interacting with a user interface of a development tool 12, as described above.

I/O adapter 405 preferably connects to storage device(s) 406, such as one or more of hard drive, compact disc (CD) drive, floppy disk drive, tape drive, etc. to computer system 400. The storage devices may be utilized when RAM 403 is insufficient for the memory requirements associated with storing data for operations of the development tool 12, browser 18, and/or logic of web server 14. Communications adapter 411 is preferably adapted to couple computer system 400 to network 412, which may enable information to be input to and/or output from system 400 via such network 412 (e.g., the Internet or other wide-area network, a local-area network, a public or private switched telephony network, a wireless network, any combination of the foregoing). User interface adapter 408 couples user input devices, such as keyboard 413, pointing device 407, and microphone 414 and/or output devices, such as speaker(s) 415 to computer system 400. Display adapter 409 is driven by CPU 401 to control the display on display device 410 to, for example, display information pertaining to an application under development, such as code view 101 an or design view 102 of development tool 12, and/or to display output presentation document 104 via a browser 18, as discussed above, according to certain embodiments of the present invention.

It shall be appreciated that the present invention is not limited to the architecture of system 400. For example, any suitable processor-based device may be utilized for implementing software development tool 12, browser 18, and/or web server 14, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:

discovering, by a software development tool executed by a processor, a plurality of related files for generating an output presentation document, wherein discovering the plurality of related files comprises:

receiving at least one main file comprising executable code for generating the output presentation document, wherein the executable code includes references to each of the plurality of related files, wherein at least some of the plurality of related files comprise additional executable code for generating the output presentation document;

automatically identifying the plurality of related files from the references in the executable code of the at least one main file;

presenting, by the software development tool, a development interface comprising:

a design view interface comprising a preview of the output presentation document generated from executing the at least one main file and the plurality of related files, a common graphical interface separate from the design view interface, wherein the common graphical interface comprises a plurality of visual indicators, wherein each visual indicator is associated with a respective related file of the plurality of related files, and a code view interface configured to selectively present the executable code of the at least one main file and to selectively present at least some respective additional executable code of a selected related file in response to a selection of at least one of the plurality of visual indicators corresponding to the selected related file;

wherein the design view interface, the common graphical interface, and the code view interface are simultaneously presented within the development interface;

responsive to a selection of at least one visual indicator of the plurality of visual indicators, presenting, by the software development tool, content of at least one related file of the plurality of related files in the code view interface, wherein the content comprises executable source code of the at least one related file;

determining, by the software development tool, that a first subset of the plurality of related files comprises textual content and a second subset of the plurality of related files comprises non-textual content;

including, by the software development tool, at least one file of the second subset comprising the non-textual content in the common graphical interface; and responsive to a selection at the common graphical interface of the at least one file, executing, by the software development tool, a non-textual content editor for editing the non-textual content corresponding to the at least one file.

2. The method of claim 1, wherein determining that the at least one file comprises the non-textual content comprises determining that the at least one file comprises video content and wherein executing the non-textual content editor comprises executing a video editor.

3. The method of claim 1, wherein determining that the at least one file comprises the non-textual content comprises determining that the at least one file comprises image content and wherein executing the non-textual content editor comprises executing an image editor.

4. A method comprising:
discovering, by a software development tool executed by a processor, a plurality of source files for generating an output presentation document by an interpreter application;
determining, by the software development tool, that a subset of the plurality of source files comprises non-textual content and that an additional subset of the plurality of source files comprises textual content;
presenting, by the software development tool, a respective visual indicator for each of the plurality of source files in a common graphical interface; and
responsive to a selection in the common graphical interface of a visual indicator corresponding to at least one file of the subset, executing, by the software development tool, a non-textual content editor for editing the non-textual content.

5. The method of claim 4 wherein one or more of the source files comprise at least one of:
a markup language file, stylesheet file, and scripting language file.

6. The method of claim 4 wherein one or more of the source files comprise at least one of:
a hypertext markup language (HTML) file, extensible, markup language (XML) file, ColdFusion Markup Language (CFML) file, cascading stylesheet (CSS) file, JavaScript (JS) file, PHP file, and active server page (ASP) file.

7. The method of claim 4 wherein the source files comprise at least one main file and at least one related file.

8. The method of claim 7 wherein the at least one main file comprises a markup language file, and wherein the at least one related file comprises at least one of: a markup language file, stylesheet file, and scripting language file.

9. The method of claim 4 wherein the interpreter application comprises a web browser.

10. The method of claim 4 wherein the visual indicators comprise graphical tabs that each identifies a corresponding one of the source files.

11. The method of claim 4, further comprising presenting, by the software development tool, a code view interface that displays textual source code of a selected one of the source files, wherein the visual indicators are visually associated with the code view interface.

12. The method of claim 11, wherein the visual indicators are included on a toolbar of the code view interface.

13. The method of claim 4 wherein the source files are server-side files hosted by a server.

14. The method of claim 13 further comprising:
presenting, by the software development tool, a code view interface that displays textual source code of a selected one of the source files,
presenting, by the software development tool, a design view interface that displays a preview of the output presentation document;
receiving, in at least one of the code view interface and the design view interface, input indicating one or more edits to at least one of the source files; and
storing the edited at least one source file to the server;
wherein the common graphical interface, the code view interface, and the design view interface are simultaneously presented in a development interface.

15. A system comprising:
a non-transitory computer-readable medium to which instructions of a web development tool are stored;
a processor configured to execute said instructions that when executed by the processor causes the processor to:
discover a plurality of source files for generating an output presentation document,
determine that a subset of the plurality of source files comprises non-textual content and that an additional subset of the plurality of source files comprises textual content,
present a respective visual indicator for each of the plurality of source files in a common graphical interface, and
responsive to a selection in the common graphical interface of a visual indicator corresponding to at least one file of the subset, executing a non-textual content editor for editing the non-textual content.

16. The system of claim 15 wherein the source files comprise at least one of:
a markup language file, stylesheet file, and scripting language file.

* * * * *